June 22, 1926.

H. TSCHERNING

STOVE DAMPER

Filed April 5, 1926

Inventor:
Henry Tscherning,
By Dyrenforth, Lee, Chritton & Wiles,
Attys.

Patented June 22, 1926.

1,589,909

UNITED STATES PATENT OFFICE.

HENRY TSCHERNING, OF FREEPORT, ILLINOIS, ASSIGNOR TO ARCADE MANUFACTURING CO., OF FREEPORT, ILLINOIS, A CORPORATION OF ILLINOIS.

STOVE DAMPER.

Application filed April 5, 1926. Serial No. 99,824.

My invention relates to stove dampers of the type employing a damper and a separate pivoting spindle insertable through the pipe in which the damper is to be located and into operative position relative to the damper for pivotally supporting the latter in place; my objects, generally stated, being to provide a novel, simple and inexpensive construction of stove damper of the type referred to, and more especially of such construction that the spindle for pivotally supporting the damper may be assembled with the damper into interlocked position relative thereto, from either side of the damper.

Referring to the accompanying drawings:—

Figure 1:
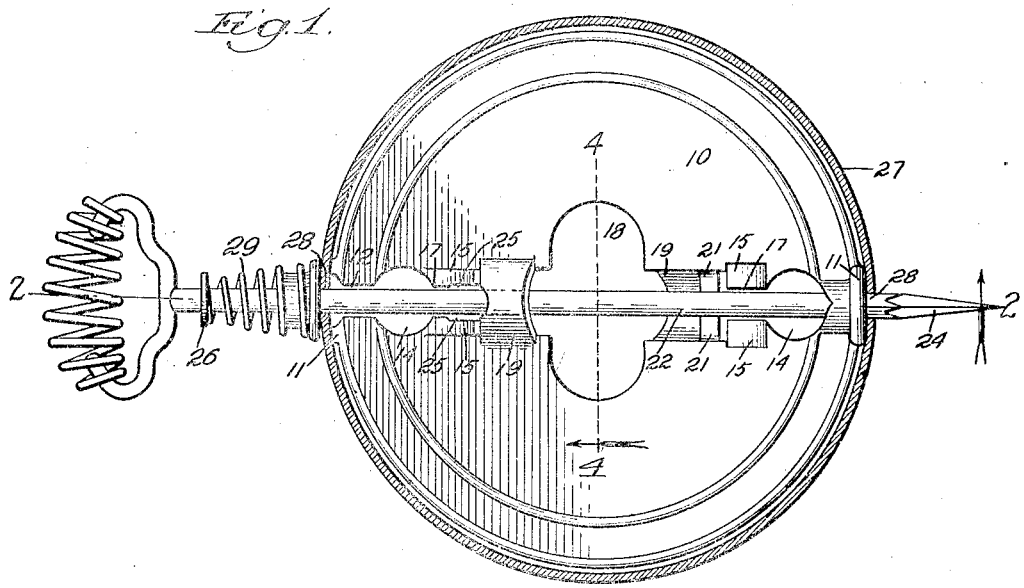
Figure 2:
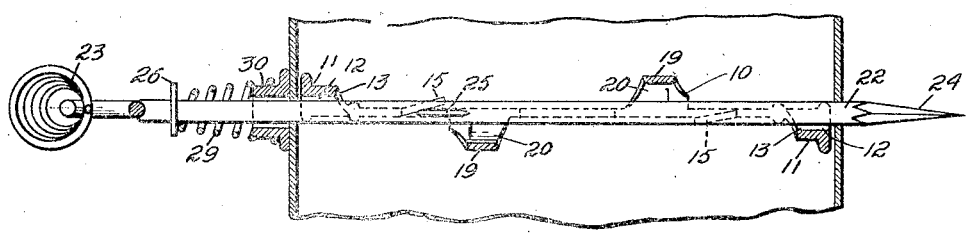
Figure 3:
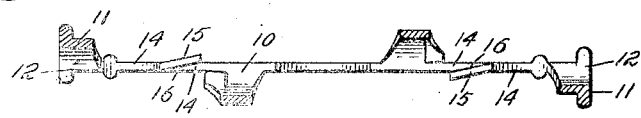
Figures 4, 5:
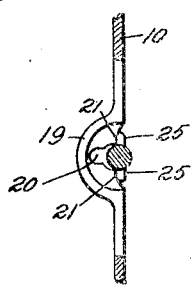

Figure 1 is a plan view of my improved damper device showing it as installed in a pipe shown in cross section. Figure 2 is a sectional view taken at the line 2—2 on Fig. 1 and viewed in the direction of the arrow. Figure 3 is a diametrical section of the damper, the section being taken at a line corresponding with the line 2 on Fig. 1. Figure 4 is a section taken at the line 4—4 on Fig. 1 and viewed in the direction of the arrow; and Figure 5, a detail view of the damper.

The device, according to the preferred illustrated embodiment of my invention, comprises a circular damper 10 provided at diametrically opposite sides of its rim portion with oppositely extending, curved, strap-portions 11 presenting channels 12 in the plane of the damper with grooves 13 extending lengthwise of these channels. The damper, inwardly of the straps 11, contains apertures 14 into which pairs of lugs 15 having surfaces 16 which incline toward the periphery of the damper in a direction away from the adjacent straps 11, extend, the lugs 15 at opposite sides of the center of the damper, being spaced apart, as shown, and forming constrictions 17 of the apertures 14. The apertures 14 are shown as opening into a central aperture 18 in the damper 10, such as is commonly provided in dampers to prevent the pipe equipped with the damper from being entirely closed when the damper is in closed position, and bridging the apertures 14, between the lugs 15 and the aperture 18, are oppositely extending strap-portions 19 presenting groves 20 flanked by substantially flat bearing-surfaces 21 slightly offset from the axis of the damper at the side thereof opposite that at which the adjacent pair of lugs 21, extend.

The device also comprises a spindle 22 provided at one end with a handle portion 23, with its opposite end preferably pointed, as represented at 24, the spindle being provided between its ends with diametrically opposed laterally extending projections 25 which may be formed by stamping them from the body of the spindle, the spindle also being provided with an annular flange 26 rigid therewith at its handle-equipped end.

The parts of the damper device are assembled into operative relation to each other and to a pipe, as by introducing the damper 10 into the pipe to be equipped therewith, as for example that represented at 27, to extend crosswise of the pipe. The spindle 22 with a coil spring 29 and a washer 30 threaded thereon to the position shown in the drawings, is then driven at its pointed end, through a side of the pipe adjacent the damper 10 and passed through the diametrically disposed opening in the damper and driven through the opposite side of the pipe, the openings thereby produced in the pipe being represented at 28. If desired, the holes 28 may be preliminarily formed in the pipe in any suitable way. In assembling the spindle with the damper, the spindle is rotated to a position in which one of the projections 25 registers with the groove 13 in the adjacent strap member 11, and is then pressed inwardly, against the resistance of the spring 29, to a position in which the projections 25 extend radially inwardly beyond the adjacent bearing surfaces 21. The operator then rotates the spindle throughout approximately 90° and releases his grasp thereon whereupon the spindle, under the action of the spring 29, is retracted into a position in which the projections 25 ride upon the adjacent camming surfaces 16, and force the spindle against the strap portion 19, thereby firmly locking the spindle against rotation relative to the damper.

The parts of the damper and spindle are preferably so constructed and arranged as shown that in the riding of the projections 25 upon the surfaces 16, as stated, these projections will flatwise engage the bearing-surfaces 21 of the straps 19, whereby the interlock between the spindle and the blade-portion is between the projections 25 and the surfaces 16 and 21.

It will furthermore be understood from the foregoing description and the drawings, that the spindle may be inserted into operative position relative to the damper 10, from either of opposite side, or edge, portions of the damper, by reason of the duplication of the spindle-interlocking portions at opposite sides or edges of the damper as disclosed, this being of advantage inasmuch as it greatly facilitates the installation of the damper device in place.

While I have illustrated and described a particular construction embodying my invention, I do not wish to be understood as intending to limit it thereto, as the same may be variously modified and altered without departing from the spirit of my invention.

What I claim as new, and desire to secure by Letters Patent, is:

1. In a damper device, the combination of a damper containing a substantially diametrically disposed opening for receiving a pivoting spindle, said spindle being provided with oppositely extending lateral projections and said damper being provided with inclined projection-engaging surfaces for engagement by said projections and inwardly of said surfaces with a surface against which the projection-equipped portion of said spindle is forced by engagement of said projections with said inclined surfaces.

2. In a damper device, the combination of a damper containing a substantially diametrically disposed opening for receiving a pivoting spindle, said spindle being provided with oppositely-extending lateral projections and said damper being provided with a pair of spaced apart inclined projection-engaging surfaces and inwardly of said surfaces with a surface against which the projection-equipped portion of said spindle is forced by engagement of said projections with said inclined surfaces.

3. In a damper device, the combination of a damper containing a substantially diametrically disposed opening for receiving a pivoting spindle, said spindle being provided with oppositely extending lateral projections and said damper being provided with a pair of spaced apart inclined projection-engaging surfaces and inwardly of said surfaces with a pair of spaced apart surfaces against which the projections on said spindle are forced by engagement of said projections with said inclined surfaces.

HENRY TSCHERNING.